US008728617B2

(12) United States Patent
Benenati et al.

(10) Patent No.: US 8,728,617 B2
(45) Date of Patent: May 20, 2014

(54) MICROPOROUS MATERIAL CONTAINING A SECURITY FEATURE

(75) Inventors: Paul L. Benenati, Wadsworth, OH (US); James L. Boyer, Monroeville, PA (US); Charles R. Coleman, Pittsburgh, PA (US); Luciano M. Parrinello, Allison Park, PA (US); Narayan K. Raman, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 72 days.

(21) Appl. No.: 12/971,726

(22) Filed: Dec. 17, 2010

(65) Prior Publication Data
US 2011/0127763 A1 Jun. 2, 2011

Related U.S. Application Data

(63) Continuation-in-part of application No. 11/855,723, filed on Sep. 14, 2007, now abandoned.

(60) Provisional application No. 60/845,575, filed on Sep. 19, 2006.

(51) Int. Cl.
*B32B 5/22* (2006.01)
*C08J 9/28* (2006.01)

(52) U.S. Cl.
USPC ............... 428/317.9; 428/315.5; 428/315.9; 428/316.6; 283/74; 521/64; 521/61; 264/211.12

(58) Field of Classification Search
USPC ........ 428/316.6, 317.9, 315.5, 315.9; 283/74; 521/61, 64; 264/211.12
See application file for complete search history.

(56) References Cited

U.S. PATENT DOCUMENTS

| | | | |
|---|---|---|---|
| 2,940,830 A | 6/1960 | Thornhill | |
| 3,772,200 A | 11/1973 | Livesay | |
| 4,053,433 A | 10/1977 | Lee | |
| 4,390,452 A | 6/1983 | Stevens | |
| 4,681,750 A | 7/1987 | Johnson et al. | |
| 5,196,262 A | 3/1993 | Schwarz et al. | |
| 6,114,023 A | 9/2000 | Schwarz et al. | |
| 6,647,649 B2 | 11/2003 | Hunt et al. | |
| 7,166,249 B2 * | 1/2007 | Abrams et al. | 264/132 |
| 7,551,750 B2 * | 6/2009 | D'Amato et al. | 382/100 |
| 2003/0211296 A1 * | 11/2003 | Jones et al. | 428/195.1 |
| 2003/0219587 A1 | 11/2003 | Pekala | |
| 2003/0232210 A1 | 12/2003 | Haas et al. | |
| 2005/0067497 A1 | 3/2005 | Jones et al. | |
| 2005/0277710 A1 * | 12/2005 | Joyce et al. | 523/210 |
| 2006/0051530 A1 * | 3/2006 | Schwarz et al. | 428/32.24 |
| 2007/0026204 A1 * | 2/2007 | Caulley et al. | 428/195.1 |
| 2008/0261011 A1 | 10/2008 | Benenati et al. | |
| 2009/0246503 A1 | 10/2009 | Parrinello et al. | |
| 2010/0314162 A1 | 12/2010 | Gardner et al. | |
| 2011/0198837 A1 | 8/2011 | Parrinello et al. | |

* cited by examiner

*Primary Examiner* — Hai Vo
(74) *Attorney, Agent, or Firm* — Deborah M. Altman

(57) ABSTRACT

Provided is a microporous material, e.g., a microporous sheet material, having a matrix of polyolefin, finely-divided, substantially water insoluble particulate filler, a network of interconnecting pores communicating throughout the microporous material, and at least one retrospectively identifiable taggant material embedded within the matrix, optionally the at least one taggant being unique to an end user for the microporous material, wherein the polyolefin is present in the microporous material in an amount of 20 to 35 weight percent, based on the weight of the microporous material. The taggant material provides a marker, signature or code that is capable of retrospective identification by machine, instrument or by the naked eye. Articles including the microporous material and processes for preparing the microporous material also are provided.

22 Claims, No Drawings

MICROPOROUS MATERIAL CONTAINING A SECURITY FEATURE

CROSS-REFERENCE TO RELATED APPLICATIONS

This application is a continuation-in-part application of U.S. patent application Ser. No. 11/855,723, filed Sep. 14, 2007, now abandoned, which claims the benefit of priority of U.S. Provisional Application No. 60/845,575, filed Sep. 19, 2006, each of which applications is incorporated by reference herein in its entirety.

FIELD OF THE INVENTION

This invention relates to articles comprising a microporous material that contains a security feature. In particular, this invention relates to a microporous material having a minor amount of retrospectively identifiable taggant material embedded within the matrix comprising the microporous material.

BACKGROUND OF THE INVENTION

Legal, financial and identification documents ("Documents") are used daily in many aspects of everyday life in today's society. Common non-limiting examples of identification documents are identification cards, passports and drivers licenses. Non-limiting examples of financial documents are bank notes, bonds, checks and letters of credit. Non-limiting examples of legal documents are settlement agreements and other contractual agreements, and real estate deeds. Unfortunately, such documents have been illegally duplicated or altered to produce counterfeit replicates. To prevent counterfeiting or illegal alteration of such Documents or the information contained therein, a variety of methods have been employed. Some of such methods involve laminating a layer of clear material, e.g., plastic film, to the core of an identification document; the use of adhesives that make it difficult to separate such layers without destroying the document; laminating several layers of clear material to the core of an identification document, each of which clear layers contain one or more security features; and the use of covert features the presence of which is not visible without the use of special equipment, e.g., an instrument (reader) that identifies the security feature. However, because counterfeiters have become more adept at avoiding such preventative measures, it is important to provide different and more complex security features that will prevent counterfeiting or illegal alteration of Documents.

SUMMARY OF THE INVENTION

The present invention relates to a microporous material comprising a matrix of polyolefin; finely-divided, substantially water insoluble particulate filler; a network of interconnecting pores communicating throughout the microporous material; and at least one retrospectively identifiable taggant material embedded within the matrix. The at least one taggant is unique to an end user for the microporous material. The polyolefin comprises 20 to 35 weight percent, based on the weight of the microporous material, and wherein the taggant material is retrospectively identifiable by non-destructive means. Also provided is an article in the form of a sheet comprising the microporous material described above, as well as a multi-layer article wherein at least one layer comprises the microporous material. Additionally, present invention is directed to a process for preparing an article in the form of a microporous sheet comprising the steps of:

a) providing a processing plasticizer, a polyolefin, a finely-divided, substantially water insoluble particulate filler, and at least one retrospectively identifiable taggant which optionally is unique to an end user of the microporous sheet, wherein the taggant material provides at least one observable feature chosen from color, size, shape, electrical resistance, a detectable odor, a feature that is identifiable audibly, and a response to an energy stimulus chosen from visible light, non-visible light, heat, cold, electric current, electrical energy, and a magnetic field;

b) combining the processing plasticizer, polyolefin, particulate filler, and taggant material to form a substantially uniform mixture;

c) introducing the mixture into a heated barrel of a screw extruder to which is attached a sheeting die;

d) passing the mixture through the extruder and die to form a continuous microporous sheet;

e) removing the processing plasticizer from the sheet using an organic extraction liquid; and f) removing the extraction liquid from the sheet. The polyolefin can comprise from 20 to 35 weight percent of the microporous sheet.

DETAILED DESCRIPTION OF THE INVENTION

For purposes of this specification (other than in the operating examples), unless otherwise indicated, all numbers expressing quantities and ranges of materials, process conditions, etc. are to be understood as being modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurement, including that found in the measuring instrument. Also, it is to be understood that any numerical range recited in this specification is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used in the following description and claims, the following terms have the indicated meanings:

The term "Document" is intended to mean and include, but not be limited to, identification documents, financial documents, legal documents, certificates of accomplishment, and other similar documents.

The term "Identification Document" is intended to mean and include, but not be limited to, documents such as credit cards, debit cards, bank cards, phone cards, passports, driver's licenses, network access cards, employee badges, security cards, visas, immigration documentation, regional or national identification (ID) cards, citizenship cards, social security cards, security badges, voter registration cards, police ID cards, border crossing cards or documentation, security clearance badges and cards, gun permits, gift certificates or cards, labels, documents showing ownership of an article, such as an automobile title or registration card, documents showing the source or place of origin of goods, membership cards or badges, and certificates of accomplishment, including, but not limited to, graduation diplomas and graduate degrees.

The term "Financial Document" is intended to mean and include, but not be limited to, documents such as, bonds, bond coupons, certificates of deposit, checks, letters of credit and other negotiable instruments.

The term "Legal Document" is intended to mean and include, but not be limited to, contracts, conveyances, settlement agreements, other contractual agreements and real estate deeds.

The term "minor amount", as used for example in the phrase "minor amount of retrospectively identifiable taggant material" means an amount that is less than 5 weight percent, based on the weight of the unaltered microporous material, e.g., an unprinted or non impregnated sheet of microporous material.

The term "embedded", as used for example in connection with the taggant material being embedded within the matrix comprising the microporous material, is intended to mean that the embedded material is dispersed within the matrix of the microporous material as may be accomplished, for example, by blending the taggant with the ingredients used to prepare the microporous material before the microporous material is formed into an article, e.g., a sheet. The term "embedded" excludes taggant material applied to the surface of a preformed matrix of microporous material, or taggant material that has been applied to the surface of a preformed matrix of microporous material and allowed to be adsorbed to an area just below the surface of a preformed matrix of microporous material, as for example by applying ink to the surface of the preformed matrix.

The term "taggant" is intended to mean and include, but is not limited to, any material, materials or arrangement of materials that when embedded in an article comprising a microporous material provides a marker, signature or code to the article that is capable of retrospective identification. The marker, signature or code ("feature") may be, but is not limited to, a visual, covert or forensically identifiable feature (i.e., identifiable with or without a machine or instrument) that serves to distinguish a genuine article from a non-genuine article, or to indicate the articles source of manufacture or origin.

The term "retrospective identification" and like terms means and is intended to include, but is not limited to, the identification of taggants embedded in Documents by non-destructive means that include, but are not limited to, identification visually by observation with the human naked eye, and/or by the use of at least one machine or instrument. In the case of identification by machine or instrument, non-limiting examples include taggants that provide a feature that is in a form that is visible using a machine or instrument ("Reader") that reads the feature optically such as by magnification or microscopy, under infra-red (near or far), ultra-violet or other non-visible radiation, e.g., by X-ray or gamma radiation; or a taggant that provides a feature that can be identified audibly or acoustically, by detectable odor, by atomic absorption spectroscopy, by emission spectroscopy, by X-ray fluorescence analysis, by neutron irradiation, by activation analysis, by DNA analysis, by fingerprint analysis, by electrical means, e.g., by measuring conductivity or resistance, by thermal analysis, or by other optical means, e.g., by the use of polarization, photochromic and/or thermochromic materials; by chemical or mechanical analysis, or a taggant that provides a feature that produces a magnetic charge under the appropriate stimulation; and by combinations of one or more of such identifiable taggants.

The term "identifiable" is intended to mean and include, but is not limited to, identification by the naked human eye and/or by a machine or instrument; identification by chemical, electrical, thermal, or mechanical analysis; or other analytical means identification by an acoustic or audible feature (human or animal recognition); or identification by odor.

The term "covert", e.g., a covert security feature, is intended to mean and include, but is not limited to, a feature the presence of which is not visible to the user with the naked eye, requiring the use of special equipment, e.g., a Reader.

The term "forensic", e.g., a forensic security feature, means a covert feature whose presence, absence or adulteration is detected by the use of one or more chemical and/or physical analytical methods, e.g., DNA analysis.

The term "non-destructive" as used for example in connection with the term "retrospectively identifiable by non-destructive means" means that the article (e.g., a Document) containing the microporous material is not destroyed or significantly damaged during the process by which the taggant material is identified.

The term "printable", as used for example in connection with the term printable microporous material, means that the subject material can be printed using some printing media, for example, printing inks, and one or more printing methods. Non-limiting examples of such printing methods include, but are not limited to, typographic printing, e.g., rubber stamp printing, letterpress printing, flexography, and letterset printing (also known as dry offset printing and offset letterpress printing); intaglio printing, and gravure printing; planographic printing, e.g., lithography, hectograph printing and xerography; stencil printing, e.g., screen printing and mimeographic printing; typewriting and dot matrix printing; ink jet printing and electrophotographic printing.

The present disclosure describes several different features and aspects of the invention with reference to various exemplary embodiments. It is understood, however, that the invention embraces numerous alternative embodiments, which may be accomplished by combining any of the different features, aspects, and embodiments described herein in any combination that one of ordinary skill in the art would find useful.

The present invention is directed to a microporous material comprising a matrix of polyolefin; finely-divided, substantially water insoluble particulate filler; a network of interconnecting pores communicating throughout the microporous material; and at least one retrospectively identifiable taggant material embedded within the matrix.

As previously mentioned, the present invention also is directed to an article, typically in the form of a sheet, comprising the aforementioned microporous material which contains at least one retrospectively identifiable taggant material embedded within the matrix comprising the microporous material. The taggant material(s) can vary depending on the type of feature(s) that is desired to be embedded within the microporous material, e.g., the type of retrospective identification feature(s) that is to be used to verify the authenticity of the article, and the cost of using a particular taggant, including the cost involved in the retrospective identification process. Moreover, the taggant material typically is unique to the end user of the microporous material and the article into which the microporous material is incorporated. That is, a particular taggant material or combination of taggant materials can be exclusively assigned to a specified end user (e.g., a state motor vehicle division), thereby avoiding counterfeiting.

The taggant material(s) can provide at least one response that include, but are not limited to, a visual response such as color, size and/or shape, and/or a response to energy stimuli such as visual light, heat and/or cold, and non-visible light such as infrared light and ultraviolet light, electric current, electrical energy and a magnetic field and/or the taggant materials themselves can influence or alter an electrical or magnetic field. Further the taggant material, in some instances, can exhibit multiple responses. Taggant materials are commercially available from various sources. Suitable examples can include, but are not limited to Microtaggant® brand identification particles, which are available from Microtrace, LLC of Minneapolis, Minn.; NightGlo$^{TN}$ phosphorescent pigments from Day Glo Color Corporation of Cleveland, Ohio; and Techmer PM 52511825 blue additive from Techmer PM of Rancho Dominguez, Calif.

The taggant materials can be chosen, for example, from a visually observant dye, fiber and/or pigment. Also the taggant can be for example, a material that is chosen from fluorescent materials, phosphorescent materials, dichroic dye pigments, polarizable materials, photochromic materials, thermochromic materials, electrochromic materials, infrared and near infrared light-responsive materials, ultraviolet light-responsive materials, materials responsive to other forms of radiation such as X-ray and gamma rays, semi-conducting nanocrystals including but not limited to compounds such as cadmium selenide, magnesium selenide, calcium selenide, barium selenide and zinc selenide, materials that are identifiable by reflection or absorption of light, materials that emit an audible or acoustic signal, materials that emit an odor, magnetic materials, conductive materials and materials that are responsive to stimuli by a magnetic field. If the microporous material is a microporous sheet that is produced by for example extrusion, the taggant material chosen should be resistant to temperatures to which it may be exposed during extrusion or other processing during its preparation.

As known to those skilled in the art, fluorescent and phosphorescent materials emit visible radiation when an atom or molecule passes from a higher to a lower electronic state. The difference between two types of materials is that the emission of luminescence after exposure to radiation from the fluorescent material occurs sooner than that from a phosphorescent material.

Fluorescent materials, such as fluorescent dyes, which are known to those skilled in the art can be used as taggant materials in the present invention. See Haugland, R. P. (1996) *Molecular Probes Handbook for Fluorescent Probes and Research Chemicals*, 6th edition. Examples of suitable fluorescent dyes include, but are not limited to anthracenes, tetracenes, pentacenes, rhodamines, benzophenones, coumarins, fluoresceins, perylenes and mixtures thereof.

Phosphorescent materials, such as phosphorescent dyes, as are known to those skilled in the art can be used as taggant materials in the present invention. Examples of suitable phosphorescent dyes include but are not limited to metal-ligand complexes such as tris(2-phenypyridine)iridium [Ir(ppy)3]; 2,3,7,8,12,13,17,18-octaethyl-21H,23H-porphyrin platinum (II) [PtOEP], and organic dyes such as eosin (2',4',5',7'-tetrabromofluorescein), 2,2'-bipyridine and erythrosin (2',4',5',7'-tetraiodofluorescein).

Non-limiting examples of microparticles (i.e., taggants) that can be used for purposes of retrospective identification are described, for example, in column 2, line 28 to column 6, line 47 of U.S. Pat. No. 4,053,433 and in column 1, line 46 to column 3, line 33 of U.S. Pat. No. 4,390,452, which disclosures are incorporated herein by reference. Such taggants include a sequence of visually distinguishable dyed and/or pigmented layers or other identifying indicia. The taggants can be coded with particular color sequences and/or alpha numeric codes that can be detected visually with a microscope or other magnifying devices. For example, the taggant material can contain a numeric code sequence in a multiple colored layer format. See also, U.S. Pat. No. 6,647,649 at column 3, line 40 to column 7, line 20, which disclosure is incorporated herein by reference. The size of the taggant material can vary. In a non-limiting embodiment, the size of the taggant material can vary from 1 micron to 1 millimeter, e.g., from 10 microns to 600, such as from 20 or 50 microns to 250 microns, at their average cross section.

The taggant material can comprise combinations of chemical elements that are incorporated into microspheroids of glass beads in discrete concentration levels, e.g., in amounts of 0.5, 1.0, and 2.0 percent by weight. The microspheroids can range from 1 to 250 microns, e.g., from 20 to 100 microns. See the description in column 1, line 55 to column 4, line 15 of U.S. Pat. No. 3,772,200, which disclosure is incorporated herein by reference, and which uses combinations of ten chemical elements.

Taggant materials that comprise energy-sensitive materials can be embedded in the microporous material for purposes of retrospective identification. Non-limiting examples of energy sensitive materials include photochromic, dichroic polarizable and/or thermochromic media, e.g., dyes, which have different optical properties under different conditions. For example, a thermochromic material is transparent in one temperature range, but opaque outside of that range. Photochromic materials can be transparent or one color under white light of a specified range of frequencies, e.g., from 400 to 750 nanometers, but a different color when exposed to light outside of that range of frequencies, e.g., to ultraviolet light. A combination of photochromic materials each of which produce different colors in response to ultraviolet light allow the production of colors that comprise a blend of the colors produced by different photochromic materials to be produced in response to their exposure to the energy of certain wavelengths of ultraviolet light.

In certain embodiments of the present invention, the taggant material provides at least one observable feature chosen from color, size, shape, electrical resistance, photoluminescence, a detectable odor, a feature that is identifiable audibly, and a response to energy stimuli chosen from visual light, non-visible light, heat, cold, electric current, electrical energy, and a magnetic field. The taggant material also can comprise a magnetic material that provides a unique magnetic signature, or a material that exhibits a unique NMR spectrum.

In a further embodiment of the present invention, the taggant material can provide an observable feature in response to energy stimuli chosen from fluorescent light, infra-red radiation, ultraviolet radiation, X-ray radiation and gamma radiation. For example, the taggant material may comprise an infra-red or ultraviolet light sensitive material that is responsive to certain frequencies of near or far infra-red light or to ultraviolet light. Such materials fluoresce when exposed to the particular predetermined wavelength of the selected light source.

Additionally, the taggant can comprise a material that provides an optically variable feature, which can be provided by optically variable pigments, inks, dyes and colorants ("optically variable media"). In this feature, the optically variable media appears to change color as the viewing angle of an observer changes (or as the angle of incident light striking the media changes. A non-limiting example of a media that provides an optically variable feature are relatively small particles, e.g., flakes comprising flat, irregularly shaped mica platelets coated with titanium dioxide and/or iron oxide. These particles can give a "pearlescent" effect, while smaller particles can produce a "satin" effect and larger particles produce a "glitter" effect. See for example page 5, paragraphs [0057] and [0058] of US patent publication 2005/0067497, which disclosure is incorporated herein by reference.

It also is contemplated that the taggant can comprise a liquid crystal that exhibits a difference in color when viewed in transmission and reflection as well as an angularly dependent colored reflection. See, for example, page 5, paragraphs [0059] and [0060] of US patent publication 2005/0067497, which disclosure is incorporated herein by reference.

Combinations of any of the aforementioned taggants may be used.

The concentration of taggant material embedded in the microporous material can vary depending on whether it is desired that the taggant be visually identifiable without special equipment or magnification; if the taggant is to be visually identifiable with special equipment and/or magnification, e.g., a covert taggant; including using forensic means. Typically, the identification means and type of taggant material used is determined by the desired end use of the microporous material and the articles formed therefrom.

The taggant material can be present within the microporous material matrix in an amount ranging from 0.001 to 80 weight percent based on weight of the microporous material, such as from 0.001 to 50 weight percent, or from 0.01 to 30 weight percent, or from 0.001 to 20 weight percent or from 0.001 to 10 weight percent.

In an alternative embodiment, the taggant material is present in the microporous material in a minor amount. That is, the taggant material can be present in amounts ranging from 0.001 to 5 weight percent, based on the weight of the microporous material. For example the taggant material can be present in the microporous material in amounts of from 0.01 to 4 weight percent, e.g., from 0.1 to 3 weight percent, or from 1 to 2 weight percent. Also, the taggant material (depending on the size of the taggant particle) can be present within the microporous material in a concentration of from 1 to 300 particles per square inch of microporous material. Alternatively, the taggant material(s) can be present in trace amounts, for example in a positive amount up to and including 0.001 percent by weight, based on the weight of the microporous material.

As previously mentioned in addition to the taggant material, the microporous material of the present invention comprises polyolefin, finely-divided substantially water-insoluble particulate filler, and a network of interconnecting pores communicating throughout the microporous material. The microporous material can comprise a substrate having at least one surface comprising the aforementioned polyolefin, particulate filler and network of interconnecting pores. The polyolefin typically comprises 5 to 75 weight percent, such as 9 to 71 weight percent, or 10 to 65 weight percent, or 60 weight percent, or 20 to 50 weight percent, or 20 to 35 weight percent, based on total weight of the microporous material.

The polyolefin can comprise any of a wide variety of polyolefin materials known in the art. In one embodiment, the polyolefin comprises (a) ultrahigh molecular weight polyolefin comprising ultrahigh molecular weight polyethylene and/or ultrahigh molecular weight polypropylene; (b) high density polyolefin comprising high density polyethylene and/or high density polypropylene; or mixtures of any of the foregoing polyolefins.

Non-limiting examples of the ultrahigh molecular weight (UHMW) polyolefin can include essentially linear UHMW polyethylene or polypropylene. Inasmuch as UHMW polyolefins are not thermoset polymers having an infinite molecular weight, they are technically classified as thermoplastic materials.

The ultrahigh molecular weight polypropylene can comprise essentially linear ultrahigh molecular weight isotactic polypropylene. Often the degree of isotacticity of such polymer is at least 95 percent, e.g., at least 98 percent.

While there is no particular restriction on the upper limit of the intrinsic viscosity of the UHMW polyethylene, in one non-limiting example, the intrinsic viscosity can range from 18 to 39 deciliters/gram, e.g., from 18 to 32 deciliters/gram. While there is no particular restriction on the upper limit of the intrinsic viscosity of the UHMW polypropylene, in one non-limiting example, the intrinsic viscosity can range from 6 to 18 deciliters/gram, e.g., from 7 to 16 deciliters/gram.

As used herein, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer in accordance with the following equation:

$$M = 5.37 \times 10^4 [\acute{\eta}]^{1.37}$$

wherein M is the nominal molecular weight and $[\acute{\eta}]$ is the intrinsic viscosity of the UHMW polyethylene expressed in deciliters/gram. Similarly, the nominal molecular weight of UHMW polypropylene is empirically related to the intrinsic viscosity of the polymer according to the following equation:

$$M = 8.88 \times 10^4 [\acute{\eta}]^{1.25}$$

wherein M is the nominal molecular weight and $[\acute{\eta}]$ is the intrinsic viscosity of the UHMW polypropylene expressed in deciliters/gram.

A mixture of substantially linear ultrahigh molecular weight polyethylene and lower molecular weight polyethylene also can be used. In a non-limiting embodiment, the UHMW polyethylene has an intrinsic viscosity of at least 10 deciliters/gram, and the lower molecular weight polyethylene has an ASTM D 1238-86 Condition E melt index of less than 50 grams/10 minutes, e.g., less than 25 grams/10 minutes, such as less than 15 grams/10 minutes, and an ASTM D 1238-86 Condition F melt index of at least 0.1 gram/10 minutes, e.g., at least 0.5 gram/10 minutes, such as at least 1.0 gram/10 minutes. The amount of UHMW polyethylene used (as weight percent) in this embodiment is described in column 1, line 52 to column 2, line 18 of U.S. Pat. No. 5,196,262, which disclosure is incorporated herein by reference. More particularly, the weight percent of UHMW polyethylene used is described in relation to FIG. 6 of the '262 patent; namely, with reference to the polygons ABCDEF, GHCI or JHCK of FIG. 6, which Figure is incorporated herein by reference.

The nominal molecular weight of the lower molecular weight polyethylene (LMWPE) is lower than that of the UHMW polyethylene. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities of LMWPE are found in the following Table 1.

TABLE 1

| Type | Abbreviation | Density, g/cm³ |
|---|---|---|
| Low Density Polyethylene | LDPE | 0.910-0.925 |
| Medium Density Polyethylene | MDPE | 0.926-0.940 |
| High Density Polyethylene | HDPE | 0.941-0.965 |

Any or all of the polyethylenes listed in Table 1 may be used as the LMWPE in the matrix of the microporous material. HDPE may be used because it can be more linear than MDPE or LDPE. Processes for making the various LMWPE's are well known and well documented. They include the high pressure process, the Phillips Petroleum Company process, the Standard Oil Company (Indiana) process, and the Ziegler process. The ASTM D 1238-86 Condition E (that is, 190° C. and 2.16 kilogram load) melt index of the LMWPE is less than about 50 grams/10 minutes. Often the Condition E melt index is less than about 25 grams/10 minutes. The Condition E melt index can be less than about 15 grams/10 minutes. The ASTM D 1238-86 Condition F (that is, 190° C. and 21.6 kilogram load) melt index of the LMWPE is at least 0.1 gram/10 minutes. In many cases the Condition F melt index is at least 0.5 gram/10 minutes such as at least 1.0 gram/10 minutes.

The UHMWPE and the LMWPE may together constitute at least 65 percent by weight, e.g., at least 85 percent by weight, of the polymer of the microporous material. Also, the UHMWPE and LMWPE together may constitute substantially 100 percent by weight of the polymer of the microporous material. In a particular embodiment of the present invention, the microporous material can comprise a polyolefin comprising from 10 to 100 weight percent, such as from 10 to 90 weight percent, or from 20 to 85 weight percent, or from 35 to 65 weight percent of ultrahigh molecular weight polyolefin; and from 0 to 90 weight percent, such as from 10 to 90 weight percent, or from 20 to 85 weight percent, or from 35 to 65 weight percent of high density polyolefin, where weight percents are based on the total weight of polyolefin in the microporous material.

Other thermoplastic organic polymers also may be present in the matrix of the microporous material provided that their presence does not materially affect the properties of the microporous material substrate in an adverse manner. The amount of the other thermoplastic polymer which may be present depends upon the nature of such polymer. In general, a greater amount of other thermoplastic organic polymer may be used if the molecular structure contains little branching, few long side chains, and few bulky side groups, than when there is a large amount of branching, many long side chains, or many bulky side groups. Non-limiting examples of thermoplastic organic polymers that optionally may be present in the matrix of the microporous material include low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers can be neutralized with sodium, zinc or the like. Generally, the microporous material comprises at least 70 percent by weight of UHMW polyolefin, based on the weight of the matrix. In a non-limiting embodiment, the above-described other thermoplastic organic polymer are substantially absent from the matrix of the microporous material.

As previously mentioned, the microporous material also comprises a finely-divided, substantially water-insoluble particulate filler material. The filler material typically is not colored, e.g., is a white or off-white filler material such as a siliceous or clay particulate material.

The finely divided substantially water-insoluble filler particles can constitute from 20 to 85 percent by weight of the microporous material. For example such filler particles can constitute from 20 to 80 percent by weight of the microporous material, such as from 20 percent to 70 percent by weight of the microporous material, or from 30 to 70 percent by weight of the microporous material, or from 40 to 70 percent by weight of the microporous material and even from 45 percent to 65 percent by weight of the microporous material.

The finely divided substantially water-insoluble siliceous filler may be in the form of ultimate particles, aggregates of ultimate particles, or a combination of both. At least about 90 percent by weight of the siliceous filler used in preparing the microporous material substrate has gross particle sizes in the range of from 5 to about 40 micrometers, as determined by the use of a laser diffraction particle size instrument, LS230 from Beckman Coulton, capable of measuring particle diameters as small as 0.04 micron. Typically, at least 90 percent by weight of the filler has gross particle sizes in the range of from 10 to 30 micrometers. The sizes of the siliceous filler agglomerates may be reduced during processing of the ingredients used to prepare the microporous material. Accordingly, the distribution of gross particle sizes in the microporous material may be smaller than in the raw filler itself.

Non-limiting examples of siliceous fillers that may be used to prepare the microporous material include silica, mica, montmorillonite, kaolinite, nanoclays such as cloisite available from Southern Clay Products, talc, diatomaceous earth, vermiculite, natural and synthetic zeolites, calcium silicate, aluminum silicate, sodium aluminum silicate, aluminum polysilicate, alumina silica gels and glass particles. In addition to the siliceous fillers, other finely divided particulate substantially water-insoluble fillers optionally may also be employed. Non-limiting examples of such optional fillers can include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate. In one non-limiting embodiment, silica and any of the aforementioned clays can comprise the siliceous filler. Non-limiting examples of the silicas include precipitated silica, silica gel, and fumed silica.

Silica gel is generally produced commercially by acidifying an aqueous solution of a soluble metal silicate, e.g., sodium silicate at low pH with acid. The acid employed is generally a strong mineral acid such as sulfuric acid or hydrochloric acid, although carbon dioxide can be used. Inasmuch as there is essentially no difference in density between the gel phase and the surrounding liquid phase while the viscosity is low, the gel phase does not settle out, that is to say, it does not precipitate. Consequently, silica gel may he described as a non-precipitated, coherent, rigid, three-dimensional network of contiguous particles of colloidal amorphous silica. The state of subdivision ranges from large, solid masses to sub-microscopic particles, and the degree of hydration from almost anhydrous silica to soft gelatinous masses containing on the order of 100 parts of water per part of silica by weight.

Precipitated silica generally is produced commercially by combining an aqueous solution of a soluble metal silicate, ordinarily alkali metal silicate such as sodium silicate, and an acid so that colloidal particles of silica will grow in a weakly alkaline solution and be coagulated by the alkali metal ions of the resulting soluble alkali metal salt. Various acids may be used, including but not limited to mineral acids. Non-limiting examples of acids that can be used include hydrochloric acid and sulfuric acid, but carbon dioxide can also be used to produce precipitated silica. In the absence of a coagulant, silica is not precipitated from solution at any pH. In a non-limiting embodiment, the coagulant used to effect precipitation of silica may be the soluble alkali metal salt produced during formation of the colloidal silica particles, or it may be an added electrolyte, such as a soluble inorganic or organic salt, or it may be a combination of both.

Precipitated silica can be described as precipitated aggregates of ultimate particles of colloidal amorphous silica that have not at any point existed as macroscopic gel during the preparation. The sizes of the aggregates and the degree of hydration may vary widely. Precipitated silica powders differ from silica gels that have been pulverized in generally having a more open structure, that is, a higher specific pore volume. However, the specific surface area of precipitated silica, as measured by the Brunauer, Emmet, Teller (BET) method using nitrogen as the adsorbate, is often lower than that of silica gel.

Many different precipitated silicas can be employed as the siliceous filler used to prepare the microporous material. Precipitated silicas are well-known commercial materials, and processes for producing them are described in detail in many United States patents, including U.S. Pat. Nos. 2,940,830, 2,940,830, and 4,681,750. The average ultimate particle size (irrespective of whether or not the ultimate particles are agglomerated) of precipitated silicas used is generally less than 0.1 micrometer, e.g., less than 0.05 micrometer or less than 0.03 micrometer, as determined by transmission electron microscopy. Precipitated silicas are available in many grades and forms from PPG Industries, Inc. These silicas are sold under the Hi-Sil® tradename.

In a non-limiting embodiment, finely divided particulate substantially water-insoluble siliceous filler comprises at least 50 percent by weight, e.g., at least 65, 75 or 85 percent by weight of the substantially water-insoluble filler material. The siliceous filler can comprise from 50 to 90 percent by weight, e.g., from 60 to 80 percent by weight, of the filler material or the siliceous filler can comprise substantially all of the substantially water-insoluble filler material.

The filler, e.g., the siliceous filler, typically has a high surface area allowing the filler to carry much of the processing plasticizer used to form the microporous material. High surface area fillers are materials of very small particle size, materials that have a high degree of porosity, or materials that exhibit both characteristics. The surface area of at least the siliceous filler particles can range from 20 to 400 square meters per gram, e.g., from 25 to 350 square meters per gram, as determined by the Brunauer, Emmett, Teller (BET) method according to ASTM D1993-91. The BET surface area is determined by fitting five relative-pressure points from a nitrogen sorption isotherm measurement made using a Micromeritics TriStar 3000™ instrument. A FlowPrep-060™ station can be used to provide heat and continuous gas flow during sample preparation. Prior to nitrogen sorption, silica samples are dried by heating to 160° C. in flowing nitrogen (PS) for 1 hour. Generally, but not necessarily, the surface area of any non-siliceous filler particles used is also within one of these ranges. The filler particles are substantially water-insoluble and also can be substantially insoluble in any organic processing liquid used to prepare the microporous material. This can facilitate retention of the filler in the microporous material.

Other materials such as lubricants, processing plasticizers, organic extraction liquids, surfactants, water, and the like, optionally may be present in the microporous material. Such materials may be present in the microporous material in relatively small amounts, for example 15 percent by weight, but more or less of such materials can be used as necessary. Additionally the microporous material of the present invention can include antioxidants, ultraviolet light absorbers, flame retardants, reinforcing fibers such as chopped glass fiber strand, dyes, pigments, and the like.

On an impregnant-free basis, pores can comprise on average at least 15 percent by volume, e.g. from at least 20 to 95 percent by volume, or from at least 25 to 95 percent by volume, or from at least 35 to 65 percent by volume of the microporous material. As used herein and in the claims, the porosity (also known as void volume) of the microporous material, expressed as percent by volume, is determined according to the following equation:

$$\text{Porosity}=100[1-d_1/d_2]$$

wherein $d_1$ is the density of the sample, which is determined from the sample weight and the sample volume as ascertained from measurements of the sample dimensions, and $d_2$ is the density of the solid portion of the sample, which is determined from the sample weight and the volume of the solid portion of the sample. The volume of the solid portion of the same is determined using a Quantachrome stereopycnometer (Quantachrome Corp.) in accordance with the accompanying operating manual. Alternatively, the porosity can be calculated as described in the Examples below.

The volume average diameter of the pores of the microporous material can be determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from 138 kilopascals absolute to 227 megapascals absolute). if approximately 2 percent or less of the total intruded volume occurs at the low end (from 138 to 250 kilopascals absolute) of the high pressure range, the volume average pore diameter is taken as twice the volume average pore radius determined by the porosimeter. Otherwise, an additional scan is made in the low pressure range (from 7 to 165 kilopascals absolute) and the volume average pore diameter is calculated according to the equation:

$$d=2[v_1r_1/w_1+v_2r_2/w_2]/[v_1/w_1+v_2/w_2]$$

wherein d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. The volume average diameter of the pores can be in the range of from 0.01 to 0.50 micrometers, e.g., from 0.02 to about 0.3 micrometers, such as from 0.05 to about 0.25 micrometers.

In the course of determining the volume average pore diameter of the above procedure, the maximum pore radius detected is sometimes noted. This is taken from the low pressure range scan, if run; otherwise it is taken from the high pressure range scan. The maximum pore diameter is twice the maximum pore radius. Inasmuch as some production or treatment steps, e.g., coating processes, printing processes, impregnation processes and/or bonding processes, can result in the filling of at least some of the pores of the microporous material, and since some of these processes irreversibly compress the microporous material, the parameters in respect of porosity, volume average diameter of the pores, and maximum pore diameter are determined for the microporous material prior to the application of one or more of such production or treatment steps.

The microporous material of the present invention typically exhibits a surface resistivity in the range of $1 \times 10^5$ to $1 \times 10^{12}$ ohms per square, such as $1 \times 10^7$ to $1 \times 10^{10}$ ohms per square, and a static decay time at 50% relative humidity of 0.001 to 2 seconds, such as 0.002 to 1 second, thereby demonstrating superior static dissipation properties. "Surface resistivity" is a measure of the resistive and/or conductive properties of insulative materials in ohms/square as determined in accordance with ASTM D-257, Standard Test Methods for D-C Resistance or Conductance of Insulating Materials at 50% relative humidity. Surface resistivity values are dependent upon the relative humidity. "Static decay" is a measure of the time required in seconds for a surface exposed to both plus and minus 5 kV charge to dissipate 90% of the charge when grounded, as determined in accordance with Federal Test Method Standard (FTM) 101C, Method 4046, Electrostatic Properties of Materials at 50% relative humidity. For purposes of the present invention, as used herein in the specification and the claims, surface resistivity and static decay measurements are conducted at 50% relative humidity. Such properties make the microporous material of the present invention particularly suitable for articles, such as articles in the form of a sheet, including both single sheet articles or multi-layer sheet articles, useful as substrates for the microelectronics industry, for example in the manufacture of RFID tags or smart cards.

In a multi-layer article of the present invention, the article may be in the form of a sheet wherein at least one layer comprises a microporous material as described above. The microporous material can comprise an inner layer of the multi-layer article, although it is also suitable for use as an outer layer of the article. The multi-layer article can comprise at least a first layer in the form of a sheet comprising the microporous material of the present invention and a second layer in the form of a sheet comprising the microporous material of the present invention. In such an embodiment, the at least one taggant material in the first layer can be different from the at least one taggant material in the second layer.

Further, the present invention provides a process for preparing an article in the form of a microporous sheet comprising:

a) providing processing plasticizer, polyolefin, finely-divided, substantially water insoluble particulate filler, and at least one retrospectively identifiable taggant material (optionally unique to the end user of the microporous material), wherein the taggant material provides at least one observable feature chosen from color, size, shape, electrical resistance, a detectable odor, a feature that is identifiable audibly, and a response to an energy stimulus chosen from visible light, non-visible light, heat, cold, electric current, electrical energy, and a magnetic field;

b) combining the processing plasticizer, polyolefin, particulate filler, and taggant material to form a substantially uniform mixture;

c) introducing the mixture into a heated barrel of a screw extruder to which is attached a sheeting die;

d) passing the mixture through the extruder and die to form a continuous microporous sheet;

e) removing the processing plasticizer from the sheet using an organic extraction liquid; and f) removing the extraction liquid from the sheet. The microporous sheet can comprise any of those described above and can comprise any of the aforementioned polyolefins, particulate fillers, and taggant materials in any of the levels previously described for these components.

A sheet of microporous material that contains taggant material can be prepared by mixing the thermoplastic organic polymer, filler particles, if desired, and taggant, and any other additional ingredient, e.g. plasticizer, antioxidant, and/or lubricant, a substantially uniform mixture is obtained. Then, the mixture together with additional processing plasticizer, if required, is introduced into the heated barrel of a screw extruder to which is attached a sheeting die. A continuous sheet formed by the sheeting die is produced. Optionally, the sheet may be forwarded to a pair of heated calender rolls acting cooperatively to form a continuous sheet of lesser thickness than the continuous sheet exiting from the die.

The continuous sheet is then forwarded to a first extraction zone where the processing plasticizer is substantially removed by extraction with an organic liquid that is a good solvent for the processing plasticizer and a poor solvent for the organic polymer, and more volatile than the processing plasticizer. Generally, but not necessarily, both the processing plasticizer and the organic extraction liquid are substantially immiscible with water. The continuous sheet is then forwarded to a second extraction zone where the organic extraction liquid is substantially removed by steam and/or water. The continuous sheet is then passed through a forced air dryer for substantial removal of residual water and remaining residual organic extraction liquid. From the dryer the continuous sheet, which is a microporous material, can be passed to a take-up roll.

A sheet formed by the process of the present invention can have a thickness of 2 to 20 mils (50.8 to 508 microns), such as 2 to 18 mils, or 2 to 12 mils, or 2 to 10 mils, or 2 to 8 mils, or 2 to 5 mils. However, it should be understood that the sheet of microporous material may have a thickness less than or greater than the aforementioned thickness range, depending upon desired end uses thereof.

For purposes of the present invention, the processing plasticizer discussed above should have little solvating effect on the thermoplastic organic polymer at 60° C., and only a moderate solvating effect at elevated temperatures on the order of 100.° C. The processing plasticizer is generally a liquid at room temperature. Non-limiting examples of the processing plasticizer include processing oils such as paraffinic oil, naphthenic oil, or aromatic oil. Examples of processing oils include, but are not limited to, those processing oils meeting the requirements of ASTM D 2226-82, Types 103 and 104. Advantageously, the processing oil has a pour point of less than 22° C., according to ASTM D 97-66 (reapproved 1978), e.g., less than 10° C. Non-limiting examples of processing oils that may be used include Shellflex® 412 oil, Shellflex® 371 oil (Shell Oil Co.), which are solvent refined and hydrotreated oils derived from naphthenic crude oils, ARCOprime® 400 oil (Atlantic Richfield Co.) and Kaydol® oil (Witco Corp.), which are white mineral oils. Other non-limiting examples of processing plasticizers, include phthalate ester plasticizers, such as dibutyl phthalate, bis(2-ethylhexyl) phthalate, diisodecyl phthalate, dicyclohexyl phthalate, butyl benzyl phthalate, and ditridecyl phthalate.

Organic extraction liquids that can be used are of a diverse nature. Non-limiting examples of organic extraction liquids include 1,1,2-trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

The residual content of the processing plasticizer in the microporous material is typically less than 10 percent by weight, e.g., less than 5 percent by weight, of the microporous material. Such a residual content can be reduced even further by additional extractions using the same or a different organic extraction liquid.

Sheets of the microporous material produced by the above-described process can be used as a substrate for printing. Alternatively, those sheets may be stretched and the stretched microporous material used as a substrate for printing. It will be appreciated that stretching of the microporous sheet increases both the void volume of the material and induces regions of molecular orientation in the polyolefin. As is well known in the art, many of the physical properties of molecularly oriented thermoplastic organic polymer, including tensile strength, tensile modulus, Young's modulus, and others, differ considerably from those of the corresponding thermoplastic organic polymer having little or no molecular orientation.

Stretched microporous sheet material can be produced by stretching the sheet in at least one stretching direction above its elastic limit. Suitable means for stretching the sheet are well known in the art and will not be discussed herein.

Microporous sheet material, whether or not stretched, is printable using any of the printing media printing processes previously described.

It should be understood that the microporous material typically in the form of a sheet comprising a taggant may constitute (1) a Document in and of itself, for example when used to prepare financial documents such as checks or certificates of deposit, or stock certificates; or (2) one or more layers or substrates in a multi-layer Document such as a laminate structure used, for example, as an identification card, a driver's license, or a security label. As mentioned previously the microporous material can be customized by the inclusion of a taggant or combination of taggants unique to the end-user or customer of/for the microporous sheet. Further, the different taggant materials used in combination can exhibit different observable responses. The one or more retrospectively identifiable taggent(s) present within the microporous material matrix can provide a complex security feature that can assist in prevention of counterfeiting or illegal alteration of the Document.

The invention is further described in conjunction with the following examples, which are to be considered as illustrative rather than limiting, and in which all parts are parts by weight and all percentages are percentages by weight unless otherwise specified.

EXAMPLES

Part 1

Mix Preparation

The dry ingredients listed in Tables 2 and 3 were weighed into a FM-130D Littleford plough blade mixer with one high intensity chopper style mixing blade in the order and amounts specified. The dry ingredients were premixed for 15 seconds using only the plough blades of the mixer. The process oil was then charged into the top of the mixer by means of a pump equipped with a spray nozzle, with only the plough blades turning. Pumping time to charge the process oil into the mixer for the examples varied from 45 to 60 seconds. The contents of the mixer were then mixed for 30 seconds using both the mixer's high intensity chopper blade and plough blades. The mixer was shut off and the internal sides of the mixer were scrapped down to insure all ingredients were evenly mixed. The mixer was turned back on and the mixture was mixed for an additional 30 seconds with both the high intensity chopper and plough blades. The mixer was then turned off and the mixture dumped into a storage container.

TABLE 2

Ingredients in Examples 1-5

| Ingredients/ | Example No. | | | | |
|---|---|---|---|---|---|
| | 1 | 2 | 3 | 4 | 5 |
| | Amount (Grams) | | | | |
| Silica (a) | 2268 | 2268 | 2268 | 2194 | 2194 |
| UHMWPE (b) | 631 | 631 | 631 | 656 | 656 |
| HDPE (c) | 600 | 600 | 600 | 656 | 656 |
| $TiO_2$ (d) | 45 | 45 | 45 | 90 | 90 |
| Process oil (e) | 3810 | 3810 | 3810 | 3862 | 3862 |
| Lubricant (f) | 22.7 | 22.7 | 22.7 | 22.7 | 22.7 |
| Antioxidant (g) | 15.3 | 15.3 | 15.3 | 15.3 | 15.3 |
| Security Additive (h) | | | | | |
| MICROTAGGANT ® IR covert taggants (1) | 22 | 11 | — | — | — |
| Brown Alphaflock (2) | — | — | 18 | — | — |
| NightGlo ™ NG-15 (3) | — | — | — | 76 | — |
| NightGlo ™ NG-20 (4) | — | — | — | — | 76 |
| Techmer PM Blue (5) | 45 | 45 | 45 | — | — |

(a) Hi-Sil ® SBG precipitated silica (PPG Industries, Inc.)
(b) GUR ® 4130 Ultra High Molecular Weight Polyethylene (UHMWPE) (Ticona Corp.)
(c) Fina ® 1288 High Density Polyethylene (HDPE), (Total Petrochemicals)
(d) Tipure ® R-103 titanium dioxide (E. I. du Pont de Nemours and Company)
(e) Tufflo ® 6056 process oil (Lyondell Petroleum Corp)
(f) Synpro ® calcium stearate lubricant (Polymer Additives Division, Ferro Corp)
(g) Cyanox ® 1790 antioxidant (Cytec Industries, Inc.)
(h)(1) MICROTAGGANT ® IR covert taggant (Microtrace, LLC)
(h)(2) Brown Alphaflock viscose fiber (Alpha Flock, a division of Villafibres, Ltd.)
(h)(3) NightGlo ™ NG-15 glow-in-the-dark pigment reported to have an average particle diameter of 14 microns (DayGlo Color Corporation, Cleveland, Ohio)
(h)(4) NightGlo ™ NG-20 glow-in-the-dark pigment reported to have an average particle diameter of 20 microns (DayGlo Color Corporation, Cleveland, Ohio)
(h)(5) Techmer PM 52511E25 Blue additive (Techmer PM, Rancho Dominguez, California)

TABLE 3

Ingredients in Examples 6-10

| Ingredients/ | Example No. | | | | |
|---|---|---|---|---|---|
| | 6 | 7 | 8 | 9 | 10 |
| | Amount (Grams) | | | | |
| Silica (a) | 2270 | 2270 | 2270 | 2270 | 2270 |
| UHMWPE (b) | 654 | 654 | 654 | 654 | 656 |

TABLE 3-continued

Ingredients in Examples 6-10

| Ingredients/ | Example No. | | | | |
|---|---|---|---|---|---|
| | 6 | 7 | 8 | 9 | 10 |
| | Amount (Grams) | | | | |
| HDPE (c) | 651 | 617 | 580 | 470 | 619 |
| TiO₂ (d) | 95.3 | 95 | 95 | 95 | 90 |
| Process oil (e) | 3791 | 3791 | 3791 | 3791 | 3862 |
| Lubricant (f) | 22.7 | 22.7 | 22.7 | 22.7 | 22.7 |
| Antioxidant (g) | 15.9 | 15.9 | 15.9 | 15.9 | 15.3 |
| Microtrace MICROTAGGANT ® Forensic in HDPE (h)(6) | 3.6 | — | — | — | — |
| ARmark ™ Covert Marker in HDPE (h)(7) | — | 37.1 | 74.3 | 185.7 | 37.1 |
| NightGlo ™ NG-20 (h)(4) | | | | | 76.0 |

(h)(6) MICROTAGGANT ® Forensic taggant @ 10.26% wt % in Fina ® 1288 High Density Polyethylene (HDPE) (Microtrace, LLC)
(h)(7) ARmark ™ Covert Marker, indicia printed on surface @ 1 wt % in Fina ® 1288 High Density Polyethylene (HDPE) (ARmark ™ Authentication Technologies)
(h)(4) NightGlo ™ NG-20 glow-in-the-dark pigment reported to have an average particle diameter of 20 microns (DayGlo Color Corporation, Cleveland, Ohio)

Part 2

Extrusion, Calendering and Extraction

The mixtures of ingredients reported in Tables 2 and 3, which were prepared in Part 1, were each extruded and calendered into sheet form using the following procedures. A gravimetric loss in weight feed system (K-tron model # K2MLT35D5) was used to feed the mixture into a 27 millimeter (mm) twin screw extruder (Leistritz Micro-27gg). The extruder barrel comprised eight temperature zones and a heated adaptor attached to the sheet die. The extrusion mixture feed port was located just prior to the first temperature zone. An atmospheric vent was located in the third temperature zone. A vacuum vent was located in the seventh temperature zone.

Each mixture was fed individually into the extruder at a nominal rate of 90 grams/minute. Additional processing oil was injected at the first temperature zone, if required, to achieve the desired total oil content in the extruded sheet (typically 56-58 wt. %). Extrudate from the barrel was discharged into a 15 centimeter (cm) wide sheet Masterflex® die having a 1.5 millimeter discharge opening. The extrusion melt temperature was 203-210° C.

Calendering was accomplished using a three-roll vertical calender stack with one nip point and one cooling roll. Each of the rolls had a chrome surface. Roll dimensions were approximately 41 cm in length and 14 cm in diameter. The top roll temperature was maintained between 135° C. and 140° C. The middle roll temperature was maintained between 140° C. and 145° C. The bottom roll was a cooling roll wherein the temperature was maintained between 10 and −21° C. The extrudate was calendered into sheet form and passed over the bottom water cooled roll and wound. The material of Examples 7, 8 and 9 were calendered to a thickness of about 7 mils.

A sample of each of the calendered sheets was soaked in TCE until a target residual oil concentration of about 2-5% was achieved, typically one hour. Afterwards, the extracted sheet was air dried. Identification of embedded taggant material was performed by the methods described hereinafter in Part 4.

Part 3

Laminate Preparation

Laminates described in Table 4 were prepared by placing a single layer of the sheet material of Example 7, 8 or 9 between two layers of laminating film, each measuring 8.5"×5.5" (21.59 cm by 13.97 cm). The adhesive covered surface of each laminating film faced the material of the examples. Before completing the assembly of the layers, one 1,5"×5.5" (3.81 cm by 13.97 cm) strip of un-coated polyester film was placed between the example sheet and one of the laminating film layers at one of the 5.5" edges of the layered construction. The resultant book was placed inside a 9.5"×6.5" (24.13 cm by 16.51 cm) paper folder. A Card Guard Model 6100 roll laminator was preheated to 300° F. (148.89° C.) for 20 minutes. Once preheated, the rolls of the laminator were switched on and the folder containing the book construction was inserted into and allowed to travel between the rolls of the laminator at the units pre-set speed. Upon exiting the rolls of the laminator the resultant laminate was removed from the protective folder, allowed to cool before testing.

TABLE 4

Example Sheets Used for Laminates of Examples 11-13

| Ingredients/ | Example No. | | |
|---|---|---|---|
| | 11 | 12 | 13 |
| Sheet of Example 7 | x | — | — |
| Sheet of Example 8 | — | x | — |
| Sheet of Example 9 | — | — | x |
| Trans-Kote ® KRTY 7/3 glossy laminating film (i) | x | x | x |

(i) Trans-Kote ® KRTY 7/3 glossy laminating film (Transilwrap Company, Inc.)

Part 4

Testing and Results

The taggant material(s) incorporated into Examples 1-13 were evaluated using an appropriate identification method, as described in Tables 5 and 6. Detection of infra-red detectable taggant material was determined with a Microtrace 111b laser pen that was pointed at the sheet from a distance of from 0 to 6 inches (0-15.2 centimeters). Detection of long wave ultra-violet light detectable taggant material was determined with a Spectraline Q228 UV lamp (365 nm) by holding the lamp 1 to 6 inches (2.5 to 15.2 centimeters) from the sheet. Fluorescing materials were visible to the naked eye. Audible detection of taggant material was determined with a Microtrace audio detector. The detector was held approximately 1 inch (2.5 centimeters) from the surface of the sheet. An audible sound was heard and a light on the detector was activated. Detection of visible properties was determined by examining the product under fluorescent lighting. Detection of NightGlo™ glow-in-the-dark pigment was determined by examining the treated sample in a dark room. Detection of photoluminescent taggant material was determined by scanning the sheet with a PTI scanning spectrofluorimeter equipped with monochromatics. Detection of the Microtrace forensic taggants and ARmark™ covert markers was completed using a Nikon SMU-Z stereo microscope. In the case of the examples incorporating Microtrace forensic tags, the number of identifiable tags was determined within a 20×50 mm area (10 cm²). Identifiable meaning a tag was found, but the coded information was not necessarily easily read. For the examples incorporating ARmark covert markers, both the identifiable and legible (encoded information fully readable) tags were counted in a 20×50 mm area (10 cm²). These values are listed in Table 6.

The porosity, also known as void volume of a microporous material, is expressed as percent by volume and is determined according to the following equation:

$$\text{Porosity} = 100 \frac{\text{(Total Volume of material} - \text{Volume of Solids)}}{\text{Total Volume of material}}$$

The calculation of the porosity of Example 10 is provided in Table 7.

Electrostatic characterization tests were performed by ETS Testing Laboratories on samples of Example 9 and the formulation of Example 5 prepared as a 10 mil sheet on a commercial line of the type described in column 13, lines 9-65 in U.S. Pat. No. 6,114,023, which disclosure is incorporated herein by reference. A Comparative Example (CE) of Klockner 10 mil un-coated co-polymer PVC available from Klockner Pentaplast of America, Inc. was also included. Surface Resistivity testing was carried out in accordance with D257-07 Standard Test Methods for DC Resistance or Conductance of Insulating Materials. Static Decay testing was conducted on the samples after 48 hours of conditioning in an ETS Series 500/5000 Controller and Chamber to within 1% of the required relative humidity. An ETS Model 406 Static Decay Meter was used to perform the static decay measurements and an ETS STM-1 System Test Module was used to verify calibration of the Static Decay Meter. A Faraday Test cage was used to house the samples. A 5 kV charge across the surface of the specimen was applied. The time to dissipate 90% of the charge when grounded was measured under the 50% relative humidity conditions. The arithmetic average of the Static Decay and Surface Resistivity are included in Table 8.

TABLE 5

Identification Methods Used for Taggants in Examples 1-5

| Example 1 | Identified with IR, long wave UV and audio detector |
|---|---|
| Example 2 | Identified with IR, long wave UV and audio detector |
| Example 3 | Visible with no magnification |
| Example 4 | Identified with long wave UV, glows in dark, photoluminescent |
| Example 5 | Identified with long wave UV, glows in dark, photoluminescent |

TABLE 6

Quantification of Taggants in Examples 6-10

| Example No. | Identifiable Taggants/ 10 cm$^2$ | Legible Taggants/ 10 cm$^2$ |
|---|---|---|
| Example 6 | 8 | — |
| Example 7 | 2 | 0 |
| Example 8 | 9 | 3 |
| Example 9 | 24 | 9 |
| Example 10 | 2 | 1 |
| Example 11 | 7 | 2 |
| Example 12 | 24 | 5 |

TABLE 7

Porosity Determination of Example 10

| Teslin Ingredients | grams | Weight Fraction | Density, g/cc | Volume of Solids/g sheet (cc/g) |
|---|---|---|---|---|
| HDPE (c) | 619 | 0.1578 | 0.941 | 0.1677 |
| UHMWPE (b) | 656 | 0.1672 | 0.9325 | 0.1793 |
| TiO$_2$ (d) | 90 | 0.0229 | 4.23 | 0.0054 |
| Lubricant (f) | 22.7 | 0.0058 | 1.12 | 0.0052 |
| Antioxidant (g) | 15.3 | 0.0039 | 1 | 0.0039 |
| NightGlo ™ NG-20 (h) (4) | 76 | 0.0194 | 4 | 0.0048 |
| ARmark ™ Covert Marker in HDPE (h) (7) | 37.1 | 0.0095 | 0.941 | 0.0100 |
| Silica (a) | 2270 | 0.5786 | 2.1 | 0.2755 |
| Process Oil (e) | 137 | 0.0350 | 0.8 | 0.0438 |
| Total | 3923 | 1.0000 | | 0.6956 |

Extracted Sheet

| | |
|---|---|
| Density, g/cc | 0.64 |
| Inverse of Extracted Sheet Density, cc/g which is the Total Volume of the sheet. | 1.57 |
| Total Volume (1.57 cc/g) – Volume of Solids (0.6956 cc/g) divided by Total Volume (1.57 cc/g) times 100 = Porosity | 55.7% |

TABLE 8

Results of Static Decay & Surface Resistivity for Examples 5 and 9

| Example No. | Average of Static Decay Results @ 50% RH, seconds | Average of Surface Resistivity Results @ 50% RH, ohms/sq |
|---|---|---|
| 5 | 0.022 | 3.51 × 10$^9$ |
| 9 | 0.027 | 7.91 × 10$^9$ |
| CE | 6.17 | Not Done |

Although the present invention has been described with reference to specific details of certain embodiments thereof, it is not intended that such details should be regarded as limitations upon the scope of the invention except insofar as they are included in the accompanying claims.

Although the present invention has been described with reference to specific details of certain embodiments thereof, it is not intended that such details should be regarded as limitations upon the scope of the invention except insofar as they are included in the accompanying claims.

What is claimed is:

1. A microporous material comprising a matrix of polyolefin, finely-divided, substantially water-insoluble particulate filler, a network of interconnecting pores communicating throughout the microporous material, and at least one retrospectively identifiable taggant material dispersed within the matrix, the at least one taggant material optionally being unique to an end user for the microporous material, wherein the polyolefin comprises 20 to 35 weight percent of the microporous material, the finely-divide, substantially water-insoluble particulate filler comprises 40 to 80 weight percent of the microporous material, and the taggant material is retrospectively identifiable by non-destructive means and comprises a visually distinguishable colored sequence and/or alphanumeric code, wherein the taggant material is present in the microporous material in an amount ranging from 0.001 to 3 weight percent based on the weight of the microporous material.

2. The microporous material of claim 1 wherein the polyolefin comprises from 10 to 100 weight percent of ultrahigh molecular weight polyolefin, and from 0 to 90 weight percent of high density polyolefin, wherein said weight percents are based on the total weight of polyolefin in the microporous material; and wherein the finely-divided particulate filler comprises precipitated silica.

3. The microporous material of claim 2 wherein the pores comprise on average 35 to 65 percent by volume of the microporous material.

4. The microporous material of claim 1 wherein said taggant material further comprises an additional taggant material having at least one observable feature in response to energy stimuli chosen from fluorescent light, infra-red radiation, ultraviolet radiation, X-ray radiation and gamma radiation.

5. The microporous material of claim 4 wherein said taggant material is present in the microporous material in an amount ranging from 0.01 to 3 weight percent, based on the weight of the microporous material.

6. The microporous material of claim 1 wherein said taggant material is present in the microporous material in an amount ranging from 0.01 to 3 weight percent, based on the weight of the microporous material.

7. The microporous material of claim 6 wherein the number of legible taggants per 10 square centimeters of the microporous material is from 1 to 9.

8. An article in the form of a sheet comprising the microporous material of claim 1.

9. The article of claim 8 wherein the polyolefin comprises:
from 10 to 100 weight percent of ultrahigh molecular weight polyolefin, and
from 0 to 90 weight percent of high density polyolefin, wherein said weight percents are based on the total weight of polyolefin present in the microporous material.

10. The article of claim 8 wherein said taggant material is present in the microporous material in an amount ranging from 0.01 to 3 weight percent, based on the weight of the microporous material.

11. The article of claim 8 wherein the article in the form of a sheet has a thickness of 2 to 20 mils (50.8 to 508 microns).

12. The article of claim 8 comprising a document chosen from an identification document, a legal document, a financial document and a certificate of accomplishment.

13. The article of claim 8 wherein the interconnecting pores comprise on average 35 to 65 percent by volume of the microporous material.

14. The article of claim 8 wherein said taggant material further comprises an additional taggant material having at least one observable feature in response to energy stimuli chosen from fluorescent light, infra-red radiation, ultraviolet radiation, X-ray radiation and gamma radiation.

15. A multi-layer article comprising at least one layer in the form of a sheet comprising the microporous material of claim 1.

16. The multi-layer article of claim 15 comprising at least a first layer in the form of a sheet comprising the microporous material of claim 1 and a second layer in the form of a sheet comprising the microporous material of claim 1, wherein the at least one taggant material in the first layer is different from the at least one taggant material in the second layer.

17. The multi-layer article of claim 15, wherein the layer comprising the microporous material is an inner layer of the multi-layer article.

18. The multi-layer article of claim 15 wherein said taggant material is present in the microporous material in an amount ranging from 0.01 to 3 weight percent, based on the weight of the microporous material.

19. The microporous material of claim 1 wherein the number of legible taggants per 10 square centimeters of the microporous material is from 1 to 9.

20. A process for preparing an article in the form of a microporous sheet comprising:
a) providing a processing plasticizer, a polyolefin, a finely-divided, substantially water-insoluble particulate filler and at least one retrospectively identifiable taggant material optionally unique to the end user of the microporous sheet, wherein the taggant material is retrospectively identifiable by non-destructive means and comprises a visually distinguishable colored sequence and/or alphanumeric code, and wherein the taggant material is present in the microporous material in an amount ranging from 0.001 to 3 weight percent based on the weight of the microporous material;
b) combining the processing plasticizer, polyolefin, particulate filler, and taggant material to form a substantially uniform mixture;
c) introducing the mixture into a heated barrel of a screw extruder to which is attached a sheeting die;
d) passing the mixture through the extruder and die to form a continuous microporous sheet;
e) removing the processing plasticizer from the sheet using an organic extraction liquid; and
f) removing the extraction liquid from the sheet,
wherein the polyolefin comprises from 20 to 35 weight percent of the microporous sheet, based on the weight of the microporous sheet, and the finely-divided, substantially water-insoluble particulate filler comprises 40 to 80 weight percent of the microporous sheet, wherein the microporous material comprises a matrix of polyolefin, finely-divided, substantially water-insoluble particulate filler, a network of interconnecting pores communicating throughout the microporous material, and the at least one retrospectively identifiable taggant material dispersed within the matrix.

21. The process of claim 20 wherein said taggant material is present in the microporous sheet in amounts ranging from 0.01 to 3 weight percent, based on the weight of the microporous sheet.

22. The process of claim 20, wherein said taggant material further comprises an additional taggant material having at least one observable feature in response to energy stimuli chosen from fluorescent light, infra-red radiation, ultraviolet radiation, X-ray radiation and gamma radiation.

* * * * *

UNITED STATES PATENT AND TRADEMARK OFFICE
CERTIFICATE OF CORRECTION

PATENT NO. : 8,728,617 B2  
APPLICATION NO. : 12/971726  
DATED : May 20, 2014  
INVENTOR(S) : Paul L. Benenati et al.

Page 1 of 1

It is certified that error appears in the above-identified patent and that said Letters Patent is hereby corrected as shown below:

In the Claims

Column 22, Line 16, Claim 20, after "filler" insert -- , --

Column 22, Line 40, Claim 20, delete "sheet," and insert -- material, --

Signed and Sealed this  
Twenty-fifth Day of November, 2014

Michelle K. Lee  
*Deputy Director of the United States Patent and Trademark Office*